Jan. 27, 1959     B. W. KEESE     2,870,853
TANDEM DRIVE AXLE ASSEMBLY WITH STRAIGHT LINE
THROUGH LINE DRIVE CONNECTION

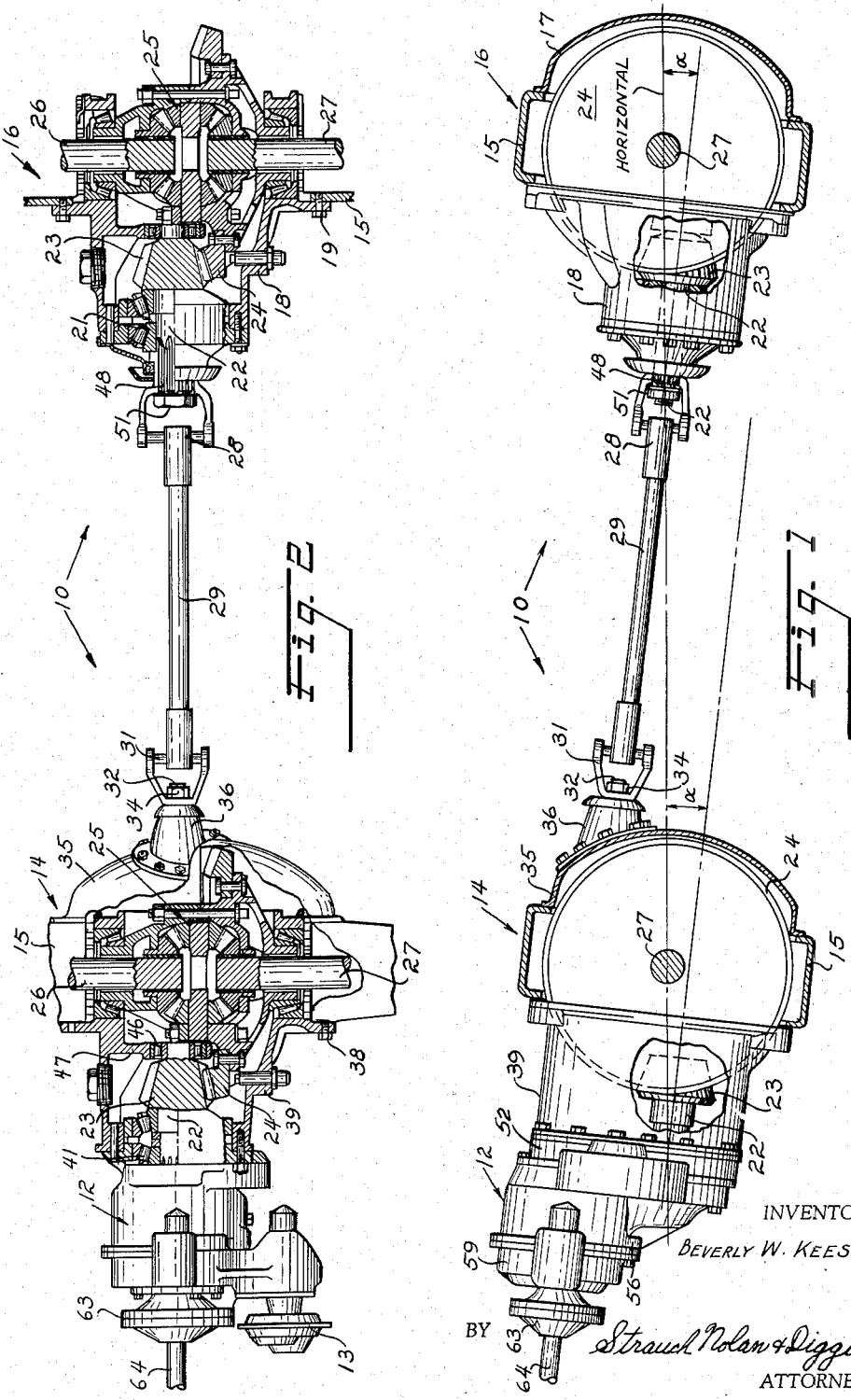

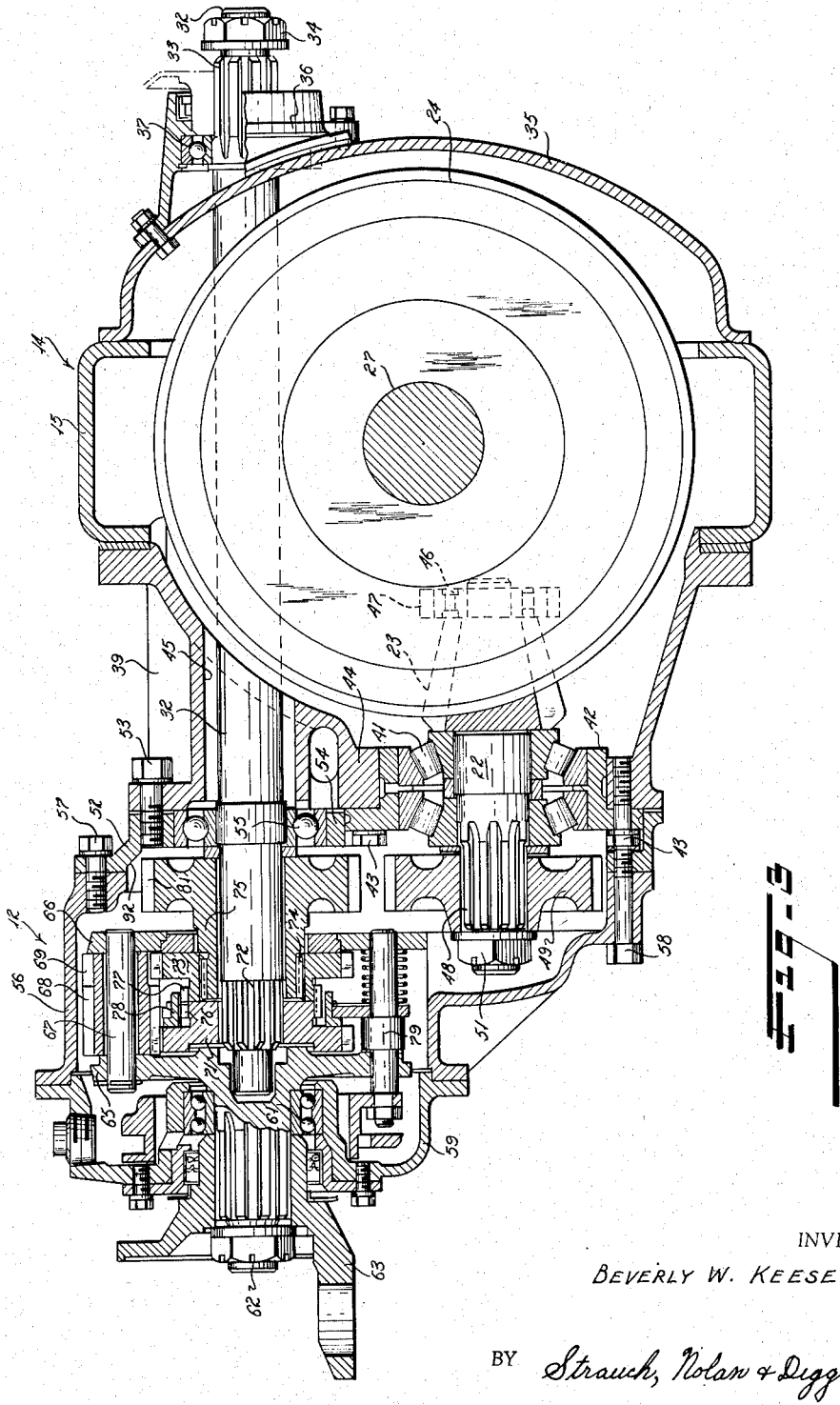

Filed Jan. 10, 1955     3 Sheets-Sheet 3

INVENTOR
BEVERLY W. KEESE

BY Strauch, Nolan & Diggins
ATTORNEYS

United States Patent Office 2,870,853
Patented Jan. 27, 1959

2,870,853
TANDEM DRIVE AXLE ASSEMBLY WITH STRAIGHT LINE THROUGH LINE DRIVE CONNECTION

Beverly W. Keese, Neenah, Wis., assignor to Rockwell-Standard Corporation, a corporation of Pennsylvania Application January 10, 1955, Serial No. 480,765

5 Claims. (Cl. 180—22)

This invention relates to tandem axle drives for roadway vehicles and more particularly to improved tandem axle drive mechanism preferably equipped with an interaxle differential and lockout.

In vehicles equipped with a multi-axle tandem drive assembly, when traction between the vehicle tires and the ground surface is good, as in highway travel, it is desirable to divide engine torque equally between the tandem drive axles and between the driving wheels on the axles. But, when traveling on slippery snow or ice covered road or for off-the-highway travel over soft ground, or through sand or mud, or during any other condition of poor traction, it is desirable to provide positive drive to both of the tandem drive axles to prevent dissipation of all the driving force to the tandem drive axles through a spinning wheel of one axle.

To accomplish equal division of torque to all driving wheels of tandem driving axles a third differential is normally utilized between the engine driven main propeller shaft and the input shaft of the tandem drive axles both of which include a conventional differential between the two axle sections. An example of such an arrangement is disclosed in U. S. Patent No. 1,492,380 to A. H. Leipert. The third or interaxle differential is usually further modified by incorporating a lockout device for introducing or locking out the interaxle differential thus enabling equal torque transmission to each drive axle or positive drive to each drive axle.

This invention is particularly adapted to a tandem drive axle unit with hypoid gear single reduction drive axles. The various elements of the drive mechanism are so inter-related that both drive axle housings and drive axle differential mechanisms are essentially identical and interchangeable. The differential carrier and the rear cover on the forward tandem drive axle are so constructed as to provide straight through passage of the drive line for the rearward tandem drive axle, and the forward tandem axle carrier housing also provides support mounting for an interaxle differential and related controls. The simplified structural arrangement of this invention enables a straight line drive connection from and including the main propeller shaft to and including the rearward axle drive pinion shaft during normal loaded conditions with no articulation between the tandem drive axles. In the preferred embodiment as shown in Figure 1, the gear transmission to the forward axle hypoid driving pinion, besides being of rugged construction, is so arranged that the forward axle hypoid driving pinion is located the same distance below the horizontal plane containing the axes of the tandem drive axles as the rearward axle driving pinion and is disposed with its axis parallel to the straight line axis of the through drive to the rearward axle. The straight line through drive during normal drive conditions substantially reduces universal joint wear since the joint elements are not articulated most of the time, and identical orientation of the hypoid driving and driven gears in each axle of the tandem assembly provides efficient functioning of both drive axles as though the drive pinions for both driving axles were on a single shaft.

Accordingly, the primary object of this invention is to provide an improved tandem axle drive having a substantially straight line through drive connection from the main propeller shaft to the rearward axle drive pinion.

Another object is to provide, in a tandem axle drive, a novel combination of an interaxle differential and special drive transfer gearing to the forward axle of the assembly.

A further object resides in the provision of a normally straight through drive line from the main propeller shaft to the driving pinion of the rearward drive axle with the input drive pinion axis in the forward drive axle located below and parallel to the straight through drive line.

A still further object resides in providing in a tandem axle drive a straight through line drive connection to the rearward drive axle from the interaxle differential passing through the forward axle differential carrier and axle housings and through a combined cover and bearing support mounted on the rear of the forward tandem drive axle housing.

A further object resides in the provision of a tandem drive axle unit wherein the through drive line to the rearward drive axle is a longitudinally straight line continuation of the drive line through the propeller shaft to the interaxle differential with the drive line parallel to the longitudinal axis of the vehicle and the through drive line to the rearward drive axle, with the tandem axle unit in normal loaded and unarticulated condition, is a substantially straight line continuation of a sloped drive line through the propeller shaft to the interaxle differential.

A still further object resides in providing an improved tandem drive assembly with an improved interaxle differential mechanism including a differential lockout mechanism.

Still another object resides in providing a tandem single reduction hypoid drive axle assembly with an interaxle differential carried by the forward axle and a straight through sloping drive line between the interaxle differential and the rear axle hypoid drive pinion.

It is a further object of the invention to provide a novel tandem axle drive wherein the forward and rearward axle mechanisms are mainly interchangeable and in novel combination with an interaxle differential carried by the forward tandem axle.

A further object of the invention is to provide a tandem axle hypoid gear drive from the output of an interaxle differential wherein the input pinion shafts to the axles are parallel and the input pinion shaft to the rearward tandem axle lies in a substantially straight line with the engine driven main propeller shaft.

Further novel features and objects of this invention will become apparent from the following detailed description and the appended claims taken in conjunction with the accompanying drawings showing a preferred embodiment thereof, in which:

Figure 1 is a side elevation of a tandem drive axle assembly according to a preferred embodiment of the invention equipped with an interaxle differential with some parts broken away, other parts in section and still other parts shown diagrammatically;

Figure 2 is a partially broken away and partially sectioned top plan view of the tandem drive axle assembly of Figure 1;

Figure 3 is an enlarged partially broken away and sectioned side elevation illustrating particularly the interaxle differential, the through drive shaft for the rearward tandem axle and the forward tandem axle drive;

Figure 4:
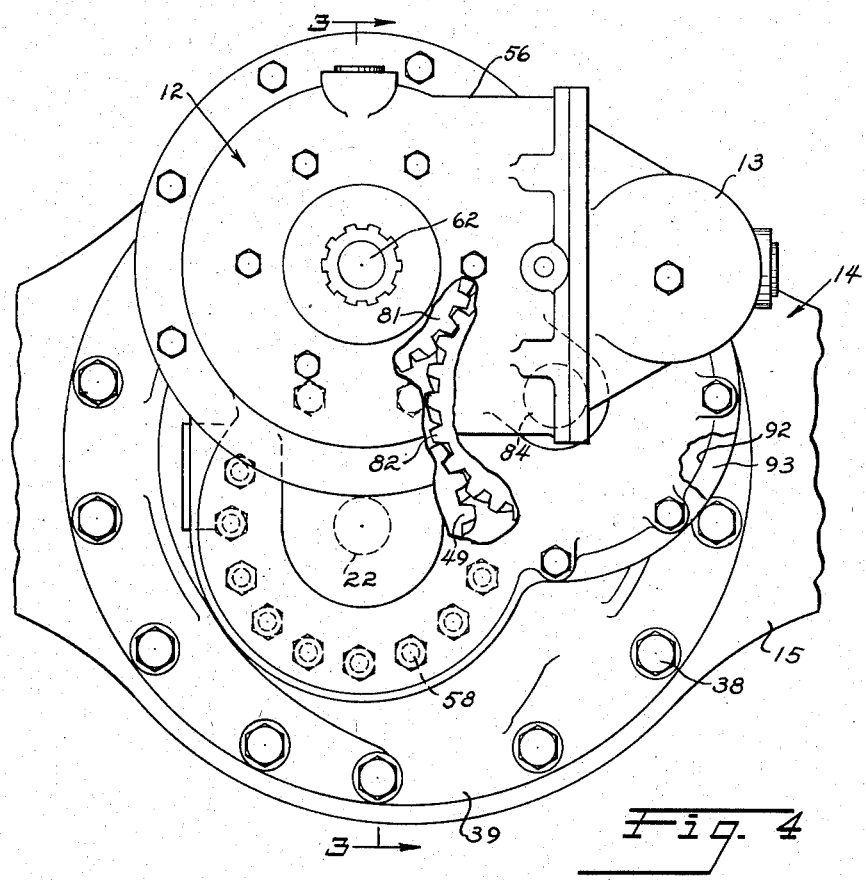
Figure 4 is an enlarged partial front elevation of the forward tandem drive axle with the interaxle differential casing partially broken away to show the cloverleaf gear transmission arrangement of the forward tandem drive axle.

In the drawings, Figures 1 and 2 illustrate a tandem drive axle assembly 10 constructed in accordance with a preferred embodiment of this invention. The assembly 10 is located beneath the rear of the chassis and is equipped with an interaxle differential 12 having an air or vacuum differential lockout actuating motor 13 mounted on the forward tandem drive axle 14. Forward drive axle 14 and rearward drive axle 16 are relatively closely spaced and constitute a tandem drive axle assembly connected to the vehicle chassis by the usual suspension. The illustrated tandem axle assembly is located beneath the rear of the chassis and the chassis, the suspension details and the outer wheel supported ends of the axles are not shown because their details do not comprise part of this invention.

Each axle comprises an identical transverse axle housing having a rear opening closed by a cover and a front opening over which is secured the differential carrier. The rearward tandem axle cover 17 completely closes the associated axle opening. The rearward tandem axle carrier 18 is removably secured to rearward tandem drive axle housing 15 as by bolts 19 and carries a bearing assembly 21 for rotatably mounting an input pinion shaft 22 having an integral hypoid pinion gear 23 meshed with a hypoid ring gear 24 fixed on the rotatable cage of the axle differential 25.

The differential 25 is preferably the usual bevel gear differential mechanism having coaxial axle shafts 26 and 27 extending from the differential side gears to the wheels (not shown). As illustrated in Figure 1, the axis of shaft 22 is disposed at an angle α to the horizontal plane containing the axes of axles 14 and 16 under normal level road conditions, the axle housing being tilted rearwardly through the same angle with the vertical. Preferably the entire axle assembly at 16 is a conventional single reduction hypoid gear drive axle that is tilted at the required angle for purposes of the invention but whose details are otherwise not part of the invention.

The front end of pinion shaft 22 is splined to mount one side of a universal joint 28 that couples it with an interaxle propeller shaft 29 having at its front end one side of a universal joint 31 which has its other side secured upon a drive shaft 32 projecting from the forward axle 14 as by splines 33 and a nut 34 (Figure 3).

The forward tandem axle comprises a transverse housing 15 having its rear opening closed by a cover 35 that is like cover 17 but has an opening over which is secured a bearing retainer 36 lined by a bearing 37 for supporting the rear end of shaft 32.

The front opening of this axle 14 has removably secured thereover as by studs 38 a differential mechanism carrier 39. Within the axle housing the carrier legs and the differential 25 including the rotatably mounted cage and the bevel gear differential from which extend coaxial axle shafts 26 and 27 are the same as in the rearward axle 16. In fact the axle housings 15 and the differential and axle shaft elements are interchangeable between the axles 14 and 16. This enables the use of standard mass production parts to facilitate assembly and reduce costs and inventory. The identical parts are given the same reference numerals in the two axles.

Figure 3 shows the forward tandem axle drive details. The hypoid axle differential ring gear 24 is meshed with hypoid pinion 23 integral with input pinion shaft 22 here journalled in a combined thrust and radial bearing assembly 41 mounted in a cage 42 secured to carrier 39 as by bolts 43, carrier 39 having an inner wall 44 at its upper end pierced by a bore 45 for free passage of shaft 32. The end of shaft 22 beyond the pinion is supported in a bearing 46 on a web 47 integral with carrier 39. Shaft 22 is the same as shaft 22 of the rearward axle 16 and the two are interchangeable thus further reducing assembly and production costs. However, in the forward axle the splined end 48 of shaft 22 has non-rotatably mounted thereon a gear 49 secured by a nut 51, for a purpose to be described.

An intermediate housing 52 is secured to carrier 39 as by bolts 53 and internally it has a web 54 to mount a bearing 55 for supporting drive shaft 32. Housing 52 also serves as an adapter for mounting the interaxle differential 12 upon the forward axle 14, and the interaxle differential housing 56 is secured to intermediate housing 52 as by bolts 57 and 58.

A cap 59 is secured over the front end of housing 56 and carries a bearing 61 for supporting an input shaft 62 to the interaxle differential coaxial with drive shaft 32. One half of universal joint 63 is non-rotatably secured upon shaft 62 and the other half is secured upon the main propeller shaft 64 which is engine driven through the usual clutch and transmission.

The interaxle differential mechanism within housing 56 comprises essentially a rotatable cage provided by shaft flange 65, side member 66 and a circumferential series of fixed pins 67. Rotatably mounted on spaced pairs of pins 67 are spur pinions 68 and 69 of different effective length meshed with each other, with all of pinions 68 meshed with a spur gear 71 non-rotatably mounted at 72 upon drive shaft 32 and all of pinions 69 meshed with spur gears 73 non-rotatably mounted at 74 upon a short shaft or sleeve 75 coaxial with and surrounding the adjacent end of shaft 32. Gears 71 and 73 are formed with clutch teeth 76 and 77 which in one position of slidable clutch collar 78 are bridged to lock the gears 71 and 73 together and thereby lock out the differential. Collar 78 is operated by a suitable control indicated at 79. This spur gear differential with lockout means is preferably the same as that disclosed in Buckendale Serial No. 242,090, filed August 16, 1951, now Patent No. 2,699,075, issued January 11, 1955, to which reference is made for further detail although it will be understood that any suitable mechanism for differentially driving shafts 32 and 75 comes within the spirit of the invention.

Figure 5:
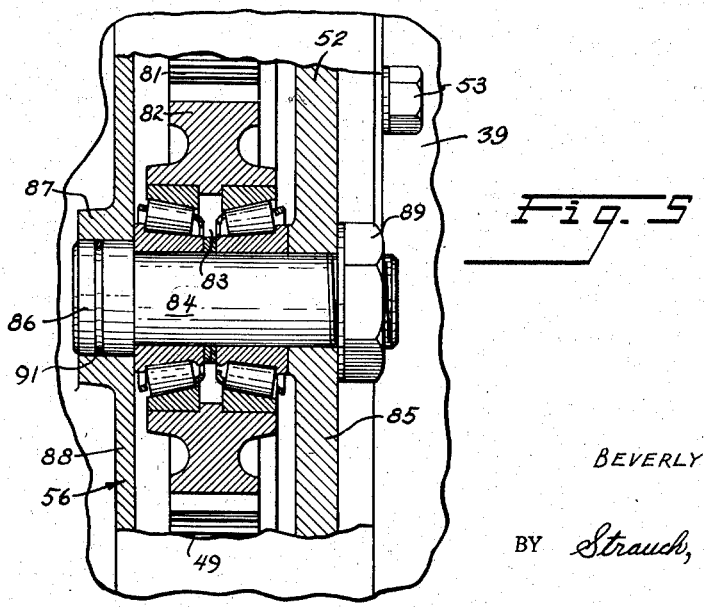
Figure 5 is a fragmentary side elevation showing the mounting of the transfer drop gear for the forward tandem drive axle.

Integral with shaft 75 is a spur gear 81 having the same number of teeth and otherwise the same size as gear 49 on shaft 22. Gear 81 is constantly meshed (Figure 5) with an intermediate gear 82 located to one side and below it, being supported by a combined radial and thrust bearing 83 upon a stub shaft 84 fixed upon a transverse wall 85 of intermediate housing 52 and having an enlarged end 86 piloted within a boss 87 on a wall 88 of the interaxle differential housing 56. When nut 89 is drawn tight upon the threaded end of shaft 84 the enlarged shaft end 86 coacts to clamp the bearing assembly 83 in position. The groove and O-ring seal arrangement at 91 prevents undesired oil leakage. Preferably as indicated in Figure 4 the adjacent ends of housings 52 and 56 are formed with opposed clusters of pockets in a general cloverleaf pattern to accommodate the transfer gearing consisting of gears 81, 82 and 49.

The forward end of intermediate housing 52 is formed to provide an opening 92 with side flange 93. Forward opening 92 is formed in the manner of a three leaf clover, having top, intermediate and bottom lobes that partially contain the respective transfer gears 81, 82 and 49. The rear mounting flange of the interaxle differential housing 56 encompasses a cloverleaf opening matching the opening 92 and is fastened to the flange 93 of member 40 by bolts 58. Cloverleaf projections of the interaxle differential housing cooperate with the respective projections on housing member 52 to completely house the transfer gears.

When the tandem axle assembly is in the normal loaded line to the rearward axle extends from the main propeller non-articulated condition of Figures 1 and 2, the drive shaft 64 straight through the interaxle differential and the forward axle 14 to the rearward axle 16. Looking down at the drive line in Figure 2, the main propeller shaft 64, input shaft 62, drive shaft 32, interaxle propeller shaft 29 and input pinion shaft 22 at the rearward axle 16 have their axes in a straight line longitudinally of the vehicle. Also (Figure 4) the input pinion shaft 22 for the forward axle lies in the vertical longitudinal plane containing the straight through drive line. Furthermore, as shown in Figure 1, the axis of straight line through drive consisting of shafts 64, 62, 32, 29 and 22 is inclined with respect to the horizontal plane normally containing the axle shaft axes of the assembly. This angle is indicated at α, and it will be observed that the input pinion shaft 22 for the forward axle 14 is inclined at the same angle to the horizontal in the assembly. As a result of the disclosed arrangement both pinions 23 mesh with the respective ring gears of the axle differentials the same distance below the horizontal plane of the axle axes.

Since the forward axle hypoid pinion drive shaft 22 is parallel to and directly below the through drive shaft 32, drive shaft 32 extending past the top of the forward differential will clear the differential hypoid ring gear 24 because the axis of shaft 32 is offset laterally from the vertical plane of the hypoid gear 24 the same distance that the axis of forward hypoid pinion drive shaft 22 is offset. The distance between and the slope of parallel through drive shaft 32 and forward hypoid pinion drive shaft 22 determines the fore and aft spacing between tandem drive axles 14 and 16.

From the foregoing there is hereby provided an improved tandem drive axle assembly equipped with an interaxle differential with lockout and hypoid gear single-reduction drive axles in novel combination. It provides an interaxle differential mounting on the front axle of a tandem axle assembly and a through longitudinal drive shaft which viewed from above is parallel to the longitudinal axis of the vehicle and which extends from the interaxle differential through the carrier and axle housings and through a bearing support and cover over an opening in the front axle bowl. This through drive shaft is part of a straight through drive line in both the top plan and the side view (when the unit is in a normal loaded non-articulated state) from the vehicle transmission through the hypoid pinion drive shaft of the rear axle. It provides a tandem axle unit in which the axle housings, hypoid pinion and pinion drive shafts, the hypoid gears, the axle differentials and the axle shafts of both axles are substantially the same and interchangeable. It provides for a front axle hypoid pinion drive shaft directly below and parallel to the through drive line for the rear axle. It also provides transfer gearing arranged in a cloverleaf design with a top gear integral with an interaxle differential output member, a drop gear and a gear splined to the hypoid pinion drive shaft of the front axle and also a cloverleaf like housing for enclosing the transfer gearing.

This invention incorporates the load-carrying advantages of tandem drive axles, the compact space-saving advantages of hypoid gearing plus the versatility and savings inherent in a lockout equipped interaxle differential and yet attains production and cost advantages of simplicity and compactness. There are no cumbersome offset propelling shafts to rapidly wear universal joints and to set up noisy and undesirable vibrations, nor is there any side overhang or unbalanced forces.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle, two relatively closely spaced parallel tandem differential equipped drive axles arranged transversely of the vehicle, an interaxle differential assembly mounted on the forward tandem axle and having an input and differentially connected outputs, a longitudinal engine driven main propeller shaft connected to said input, front mounted carrier supported parallel input pinion shafts in the respective axles lying in a common plane normal to the axle axes, a drive shaft assembly universally connected at one end to one output of said interaxle differential and universally connected at the other end to the input pinion shaft of the rearward tandem drive axle, and transfer gearing including an idler gear connecting the other output of said interaxle differential to the input pinion for the forward tandem axle to drive said pinion shaft in the same sense as said other output, said main propeller shaft, a drive shaft assembly and the input pinion shaft to the rearward tandem axle lying normally in substantially a common plane, hypoid drive pinions on the respective input pinion shafts disposed substantially the same distance below the horizontal plane normally containing the tandem axle axes.

2. The combination defined in claim 1 wherein said interaxle differential is a spur gear differential mechanism.

3. The combination defined in claim 1 wherein said forward tandem axle embodies an axle housing, an interaxle differential and transfer gear housing structure mounted on the front of said carrier and coacting therewith to enclose said transfer gearing and said interaxle differential, and rotatably mounting said pinion shaft of said forward axle.

4. The combination defined in claim 1 wherein said interaxle differential one output comprises a shaft extending through the housing of said forward axle above the axis of said forward axle.

5. In a vehicle, two relatively closely spaced parallel tandem differential equipped drive axles arranged transversely of the vehicle, an interaxle differential assembly mounted on the forward tandem axle and having an input and differentially connected outputs, a longitudinal engine driven main propeller shaft connected to said input, front mounted carrier supported parallel input pinion shafts in the respective axles lying in a common plane normal to the axle axes, similarly oriented meshing pinion and ring gears located respectively on the pinion shaft and differential of each axle, a drive shaft assembly universally connected at one end to one output of said interaxle differential and universally connected at the other end to the input pinion shaft of the rearward tandem drive axle, and transfer gearing including an idler gear connecting the other output of said interaxle differential to the input pinion for the forward tandem axle to drive said pinion shaft in the same sense as said other output, said main propeller shaft, drive shaft assembly and the input pinion shaft to the rearward tandem axle lying normally in substantially a common plane, said similarly oriented pinions on the respective input pinion shafts being disposed substantially in the same angular and spatial relation to the horizontal plane normally containing the tandem axle axes and to the vertical planes containing the respective axle axes.

References Cited in the file of this patent

UNITED STATES PATENTS

| 1,711,128 | Robbins | Apr. 30, 1929 |
| 1,856,748 | Davis | May 3, 1932 |
| 1,992,365 | Fageol | Feb. 26, 1935 |
| 2,693,244 | Rockwell et al. | Nov. 2, 1954 |
| 2,699,075 | Buckendale | Jan. 11, 1955 |

FOREIGN PATENTS

| 711,897 | Germany | Oct. 8, 1941 |
| 731,988 | Germany | Feb. 19, 1943 |

UNITED STATES PATENT OFFICE
CERTIFICATE OF CORRECTION

Patent No. 2,870,853                                    January 27, 1959

Beverly W. Keese

It is hereby certified that error appears in the printed specification of the above numbered patent requiring correction and that the said Letters Patent should read as corrected below.

Column 4, line 70, strike out "line to the rearward axle extends from the main propeller" and insert the same after "the drive" in line 71, same column.

Signed and sealed this 21st day of July 1959.

(SEAL)
Attest:

KARL H. AXLINE                                               ROBERT C. WATSON
Attesting Officer                                          Commissioner of Patents